United States Patent
Li et al.

(10) Patent No.: US 12,393,835 B2
(45) Date of Patent: Aug. 19, 2025

(54) ESTIMATION OF RESOURCES UTILIZED BY DEEP LEARNING APPLICATIONS

(71) Applicant: EMC IP Holding Company LLC, Hopkinton, MA (US)

(72) Inventors: Sanping Li, Beijing (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 1181 days.

(21) Appl. No.: 16/381,650

(22) Filed: Apr. 11, 2019

(65) Prior Publication Data

US 2019/0325307 A1    Oct. 24, 2019

(30) Foreign Application Priority Data

Apr. 20, 2018    (CN) .......................... 201810360502.3

(51) Int. Cl.
*G06N 3/08*    (2023.01)
*G06N 3/04*    (2023.01)

(52) U.S. Cl.
CPC .................. *G06N 3/08* (2013.01); *G06N 3/04* (2013.01)

(58) Field of Classification Search
CPC ........ G06N 3/04; G06N 3/0454; G06N 3/063; G06N 3/08
See application file for complete search history.

(56) References Cited

U.S. PATENT DOCUMENTS 10,069,759 B1 *  9/2018  Vadera ................... G06N 20/00
10,949,252 B1 *  3/2021  Krishnamurthy ..... G06F 9/4881
(Continued)

FOREIGN PATENT DOCUMENTS

CN    1614593  A    5/2005
CN    105630882 A    6/2016
(Continued)

OTHER PUBLICATIONS

Sun, H. et al., "Learning to Optimize: Training Deep Neural Networks for Wireless Resource Management" (Year: 2017).*
(Continued)

*Primary Examiner* — Alexey Shmatov
*Assistant Examiner* — Devika S Maharaj
(74) *Attorney, Agent, or Firm* — Ryan, Mason & Lewis, LLP (57) ABSTRACT

According to an embodiment, a performance benchmark database is obtained, where the performance benchmark database at least includes structural data of one or more deep neural network models, time performance data and computing resource consumption data of a plurality of deep learning applications based on the one or more deep neural network models; a training dataset is extracted based on the performance benchmark database, where the training dataset has a plurality of parameter dimensions, the plurality of parameter dimensions including: structures of deep neural network models of the plurality of deep learning applications, resource configuration of the plurality of deep learning applications, and training time of the plurality of deep learning applications; and correspondence among the parameter dimensions of the training dataset is created so as to create an estimation model for estimating resources utilized by deep learning applications.

20 Claims, 6 Drawing Sheets

(56) References Cited

U.S. PATENT DOCUMENTS

| | | | | |
|---|---|---|---|---|
| 2008/0016014 | A1* | 1/2008 | Sigal | G06N 3/02 706/15 |
| 2008/0319933 | A1* | 12/2008 | Moussa | G06N 3/084 706/31 |
| 2016/0132787 | A1* | 5/2016 | Drevo | G06N 20/10 706/12 |
| 2017/0124497 | A1 | 5/2017 | Crabtree et al. | |
| 2017/0228639 | A1* | 8/2017 | Hara | G06N 7/01 |
| 2017/0286839 | A1* | 10/2017 | Parker | G06N 20/00 |
| 2018/0113742 | A1* | 4/2018 | Chung | G06F 9/4881 |
| 2018/0114116 | A1* | 4/2018 | Liang | G06N 3/04 |
| 2018/0314936 | A1* | 11/2018 | Barik | G06N 3/063 |
| 2019/0156178 | A1* | 5/2019 | Thornton | G06N 3/044 |
| 2019/0220316 | A1* | 7/2019 | Zhao | G06N 3/084 |
| 2019/0243691 | A1* | 8/2019 | LaBute | H04L 47/70 |
| 2019/0258964 | A1* | 8/2019 | Dube | G06N 20/00 |
| 2019/0266015 | A1* | 8/2019 | Chandra | G06F 9/505 |
| 2020/0167691 | A1* | 5/2020 | Golovin | G06N 7/01 |

FOREIGN PATENT DOCUMENTS

| | | |
|---|---|---|
| CN | 107862022 A | 3/2018 |
| CN | 107885622 A | 4/2018 |
| CN | 107888669 A | 4/2018 |

OTHER PUBLICATIONS

Mao, H. et al., "Resource Management with Deep Reinforcement Learning" (Year: 2016).*

Yang, T., et al., "A Method to Estimate the Energy Consumption of Deep Neural Networks" (Year: 2017).*

Kumar, J. et al., "Workload prediction in cloud using artificial neural network and adaptive differential evolution", https://www.sciencedirect.com/science/article/pii/S0167739X17300444 (Year: 2017).*

Lu, Z. et al., "Modeling the Resource Requirements of Convolutional Neural Networks on Mobile Devices", https://arxiv.org/abs/1709.09503 (Year: 2017).*

Zhu, H. et al., "TBD: Benchmarking and Analyzing Deep Neural Network Training", Apr. 14, 2018, https://arxiv.org/abs/1803.06905 (Year: 2018).*

Oliveira, T. et al., "Computer network traffic prediction: a comparison between traditional and deep learning neural networks", https://www.researchgate.net/publication/288872405_Computer_network_traffic_prediction_A_comparison_between_traditional_and_deep_learning_neural_networks (Year: 2016).*

Wikipedia, "Convolutional Neural Network", https://web.archive.org/web/20180306153001/https://en.wikipedia.org/wiki/Convolutional_neural_network#expand, Mar. 6, 2018 (Year: 2018).*

Dertat, A. et al., "Applied Deep Learning—Part 4: Convolutional Neural Networks", https://towardsdatascience.com/applied-deep-learning-part-4-convolutional-neural-networks-584bc134c1e2 (Year: 2017).*

Rosebrock, A. et al., "Keras Conv2D and Convolutional Layers", https://pyimagesearch.com/2018/12/31/keras-conv2d-and-convolutional-layers/, Dec. 31, 2018 (Year: 2018).*

Sanping Li, "Modelling and Visualizing Uncertainties in Remote Sensing Information," Shanxi University, Master's Degree Thesis, Oct. 15, 2006, 154 pages.

Lyu Bo, "Research and Application of Key Technologies of Efficient Neural Architecture Search Based on Resource Awareness," University of Electronic Science and Technology of China, Doctoral Dissertation, Oct. 11, 2022, 179 pages.

T. Zhang et al., "Resource Estimation of Matrix Multiplication Based on FPGA in DNN Forward Propagation Process," Beijing University of Posts and Telecommunications, State Key Laboratory of Information Photonics and Optical Communications, Jun. 21, 2017, 13 pages.

A. Marathe et al., "Performance Modeling Under Resource Constraints Using Deep Transfer Learning," Nov. 12, 2017, pp. 1-12, vol. 31.

L. Zhi et al., "Evaluation and Internal State Interpretation Resolution of Neural Networks," Nov. 25, 2017, 24 pages.

Heart of Machine Pro, "The Most Comprehensive Guide to Deep Learning Hardware in History," Feb. 4, 2016, 16 pages.

* cited by examiner

ESTIMATION OF RESOURCES UTILIZED
BY DEEP LEARNING APPLICATIONS

RELATED APPLICATION(S)

The present application claims priority to Chinese Patent Application No. 201810360502.3, filed Apr. 20, 2018, and entitled "Estimation of Resources Utilized by Deep Learning Applications," which is incorporated by reference herein in its entirety.

FIELD

Embodiments of the present disclosure generally relate to deep learning, and more particularly, to a method, an apparatus and a computer program product for estimating resources utilized by deep learning applications.

BACKGROUND

Deep learning applications are widely used in many fields such as image classification, machine translation, speech recognition, and so on. For example, on the basis of big data and powerful computing resources, it is possible to train deep neural networks (DNN) with multiple levels and multiple parameters, which are also known as deep learning networks. Training deep learning applications based on deep neural networks is often a very difficult task, involving consumption of a large amount of computing resources and time resources to process large-scale training datasets and iterate various parameters of deep neural networks. Usually, users cannot estimate the consumption of computing and time resources of their defined deep learning applications accurately when developing deep learning applications. Therefore, the randomness of scheduling of processor resources or any attempts to use computing resources in a maximized way would lead to waste of system capabilities, energy and time.

SUMMARY

Embodiments of the present disclosure provide schemes for estimating resources used by deep learning applications.

In a first aspect of the present disclosure, there is provided a method of creating an estimation model for estimating deep learning applications. The method comprises obtaining a performance benchmark database, wherein the performance benchmark database includes at least structural data of one or more deep neural network models, time performance data and computing resource consumption data of a plurality of deep learning applications based on the one or more deep neural network models; extracting a training dataset based on the performance benchmark database, wherein the training dataset has a plurality of parameter dimensions, the plurality of parameter dimensions including: structures of deep neural network models of the plurality of deep learning applications, resource configuration of the plurality of deep learning applications, and training time of the plurality of deep learning applications; and creating correspondence among the parameter dimensions of the training dataset so as to create an estimation model for estimating resources utilized by deep learning applications. With the scheme, it is possible to estimate resources used by the user-defined deep learning application effectively, whereby an optimized resource utilization scheme can be provided to the user.

In a second aspect of the present disclosure, there is provided a device for creating an estimation model for estimating deep learning applications. The device comprises: a processing unit; and a memory coupled to the processing unit and containing instructions stored thereon, which, when executed by the processing unit, cause the device to perform acts of: obtaining a performance benchmark database, wherein the performance benchmark database includes at least structural data of one or more deep neural network models, time performance data and computing resource consumption data of a plurality of deep learning applications based on the one or more deep neural network models; extracting a training dataset based on the performance benchmark database, wherein the training dataset has a plurality of parameter dimensions, the plurality of parameter dimensions including: structures of deep neural network models of the plurality of applications, resource configuration of the plurality of deep learning applications, and training time of the plurality of deep learning applications; and creating correspondence among the parameter dimensions of the training dataset so as to create an estimation model for estimating resources utilized by the deep learning applications.

In a third aspect of the present disclosure, there is provided a method of estimating deep learning applications. The method comprises: obtaining a structure of a deep neural network model of a user-defined deep learning application based on the deep neural network model; estimating the deep learning application at least according to the structure of the deep neural network model based on an estimation model for estimating resources utilized by deep learning applications, wherein the estimation model indicates correspondence among a plurality of parameter dimensions, the plurality of parameter dimensions including: structures of deep neural network models of deep learning applications, resource configuration of deep learning applications and training time of deep learning applications.

In a fourth aspect of the present disclosure, there is provided a device for estimating deep learning applications. The device comprises: a processing unit; and a memory coupled to the processing unit and containing instructions stored thereon, which, when executed by the processing unit, cause the device to perform acts of: obtaining a structure of a deep neural network model of a user-defined deep learning application based on the deep neural network model; estimating the deep learning application at least according to the structure of the deep neural network model based on an estimation model for estimating resources utilized by deep learning applications, wherein the estimation model indicates correspondence among a plurality of parameter dimensions, the plurality of parameter dimensions including: structures of deep neural network models of deep learning applications, resource configuration of deep learning applications and training time of deep learning applications.

In a fifth aspect of the present disclosure, there is provided a computer program product being tangibly stored on a computer readable medium and comprising machine executable instructions. The machine executable instructions, when executed, cause the machine to implement the method according to the first aspect.

In a sixth aspect of the present disclosure, there is provided a computer program product being tangibly stored on a computer readable medium and comprising machine executable instructions. The machine executable instructions, when executed, cause the machine to implement the method according to the third aspect.

This Summary is provided to introduce a selection of concepts in a simplified form that are further described below in the Detailed Description. This Summary is not intended to identify key features or essential features of the claimed subject matter, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually represent the same components.

DETAILED DESCRIPTION

The present disclosure will be described herein with reference to several example implementations. It is to be understood that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The terms "an embodiment" and "one embodiment" are to be read as "at least one embodiment." The term "another embodiment" is to be read as "at least another embodiment." The terms "first," "second" and others can denote different or identical objects. The following text may also contain other explicit or implicit definitions.

Figure 1:
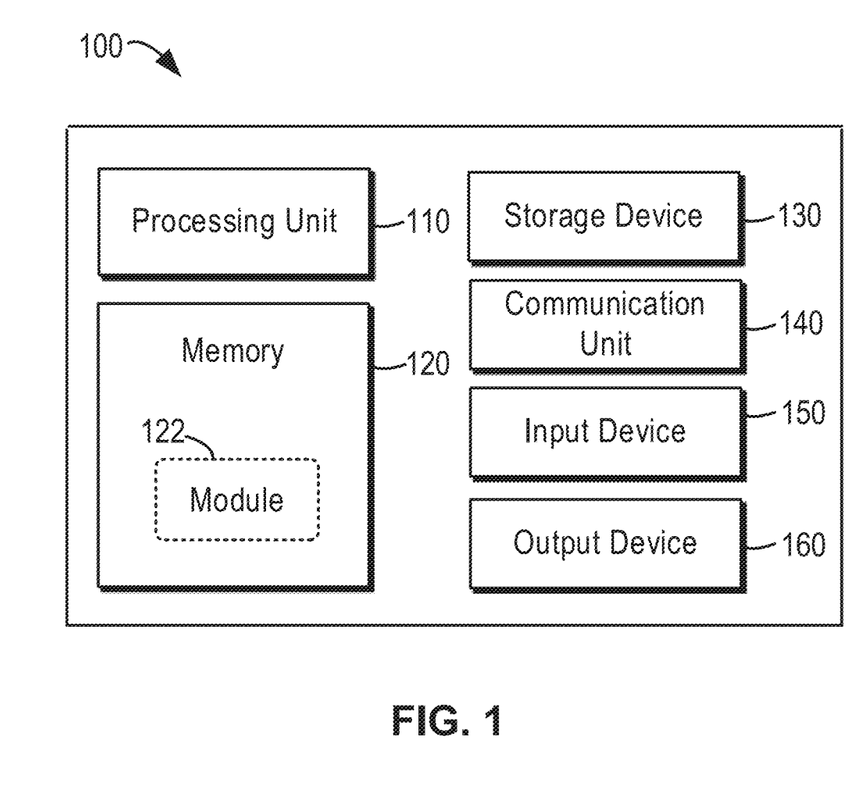
FIG. 1 is a schematic diagram illustrating an environment in which embodiments of the present disclosure may be implemented.

FIG. 1 is a block diagram illustrating a computing device 100 in which multiple embodiments of the present disclosure may be implemented. It should be understood that the computing device 100 shown in FIG. 1 is only for illustration, rather than any limitation to the functions and scope of the embodiments described herein. As shown in FIG. 1, the computing device 100 is in the form of a general-purpose computing device. The components of the computing device 100 may comprise, but are not limited to, one or more processors or processing units 110, a memory 120, a storage device 130, one or more communication units 140, one or more input devices 150, and one or more output devices 160.

In some embodiments, the computing device 100 may be implemented as various user terminals or service terminals having computing capability. The service terminals may be servers, large-scale computing devices and the like provided by various service providers. The user terminals are, for instance, any type of mobile terminal, fixed terminal, or portable terminal, including mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/video players, positioning devices, television receivers, radio broadcast receivers, electronic book devices, gaming devices or any combination thereof, including the accessories and peripherals of these devices, or any combination thereof. It is also envisaged that the computing device 100 can support any type of interface for the user (such as "wearable" circuitry).

The processing unit 110 may be a physical or virtual processor and can execute various processes based on the programs stored in the memory 120. In a multi-processor system, multiple processing units execute computer-executable instructions in parallel to improve the parallel processing capacity of the computing device 100. The processing unit 110 is also referred to as central processing unit (CPU), microprocessor, controller and microcontroller.

The computing device 100 typically includes a plurality of computer storage media, which can be any available media accessible by the computing device 100, including but not limited to volatile and non-volatile media, and removable and non-removable media. The memory 120 can be a volatile memory (for example, a register, high-speed cache, random access memory (RAM)), non-volatile memory (for example, a read-only memory (ROM), electrically erasable programmable read-only memory (EEPROM), flash memory), or any combination thereof. The memory 120 may include program modules which are configured to perform the functions of various implementations described herein.

The storage device 130 may be removable and non-removable media and may include machine readable media capable of storing information and/or data and accessible in the computing device 100. The computing device 100 may further include other removable/non-removable and volatile/non-volatile storage media. Although not shown in FIG. 1, it is possible to provide one or more disk drives for reading from and writing into removable and non-volatile disks and one or more disk drives for reading from and writing into removable and non-volatile disks. In such cases, each drive can be connected to a bus (not shown) via one or more data medium interfaces.

The communication unit 140 communicates with a further computing device via communication media. Additionally, functions of components of the computing device 100 may be implemented by a single computing cluster or multiple computing machines that are communicatively connectable for communication. Therefore, the computing device 100 may be operated in a networking environment using a logical link with one or more other servers, personal computers (PCs) or another general network node.

The input device 150 may include one or more input devices, such as a mouse, keyboard, touch screen, tracking ball, voice-input device, and the like. The output device 160 may be one or more output devices, such as a display, loudspeaker, printer, and the like. The computing device 100 may also communicate with one or more external devices (not shown) via the communication unit 140 as required. The external devices, such as storage devices and display devices and so on, communicate with one or more devices that enable the user to interact with the computing device 100, or any device (such as a network card, modem, and the like) that enables the computing device 100 to communicate with one or more other computing devices. Such communication is performed via an input/output (I/O) interface (not shown).

In some embodiments, besides being integrated into a single device, some or all the components of the computing device 100 may be configured in a form of a cloud computing architecture in which these components may be arranged remotely and may work together to accomplish the functions described herein. In some embodiments, cloud computing provides computing, software, data access and storage services which do not require the end users to know the physical location or configuration of the system or hardware that provide these services. In various embodiments, cloud computing uses appropriate protocols to provide service through a wide area network (WAN such as Internet). For example, cloud computing providers provide applications through a WAN, which are accessible through a web browser or any other computing components. Software or components of the cloud computing architecture and the corresponding data may be stored in a server at a remote location. The computing resources in a cloud computing environment may be merged at a remote data center position or distributed. Cloud computing infrastructure may provide services through a shared data center, even if they are represented by a single access point for the user. Therefore, it is possible to provide the components and functions described herein using a cloud computing architecture from a service provider at a remote location. Alternatively, they may be provided from a conventional server, or be mounted on a client device directly or in other manners.

The computing device 100 may be used for implementing the technical solutions in multiple embodiments of the present disclosure. The optimization of the learning network is also referred to as training of the learning network. By means of updating parameters of the learning network constantly, optimized parameter values may be obtained. In embodiments of the present disclosure, the learning network may also be referred to as a "neural network" or a "learning model." In the following, terms "learning model," "learning network," "neural network," "model," and "network" may be used interchangeably. The deep learning network may be designed for different applications, including object classification (such as image classification, act recognition), machine translation, speed recognition, and so on. To describe the present disclosure more clearly, an application based on a convolutional neural network in a specific embodiment described herein is used as an example for deep neural network learning applications for the purpose of illustration. However, it should be understood that concepts of the present disclosure may be applied to deep learning applications based on various other suitable types of deep neural networks.

Deep learning applications based on a deep neural network are widely applied in many fields, such as image classification, machine translation, speech recognition, and so on. However, since a user cannot accurately predict occupancy of computing resources and time resources by an application when defining the deep neural network model of the application, only when the application actually runs on hardware can the efficiency of resource consumption be optimized. Generally, most of the deep learning applications display the feature of consuming a large amount of computing and time resources, if not managed and constrained properly, they will randomly occupy processors such as graphics processing units (GPUs), or even occupy available resources to the maximum, which causes waste of energy, computing capability and running time. This problem is more prominent in a system where the deep learning application and other applications share computing resources.

Embodiments of the present disclosure have realized the above problem and propose to create an estimation model for deep learning applications based on a deep neural network. Therefore, embodiments are configured to estimate a user-defined deep learning application with an estimation model. Thus, it is not necessary to actually run the user-defined deep learning application on the hardware so as to estimate its resource consumption, which thereby provides a basis for allocating system available resources reasonably.

Figure 2:
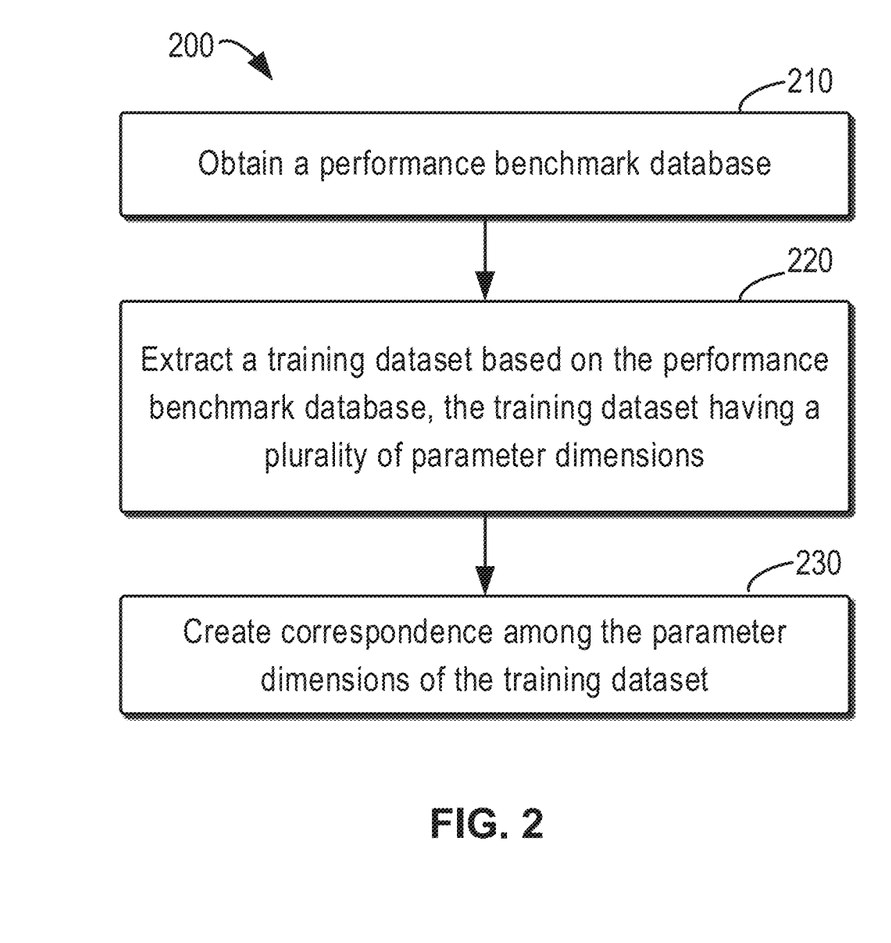
FIG. 2 is a flowchart illustrating a method for creating an estimation model for estimating a deep learning application in accordance with an embodiment of the present disclosure.

FIG. 2 is a flowchart illustrating a method 200 for creating an estimation model for estimating deep learning applications in accordance with an embodiment of the present disclosure.

As shown in FIG. 2, at step 210, for a deep learning application using a deep neural network, a performance benchmark database is obtained, which at least includes structural data of one or more deep neural network models and time performance data and computing resource consumption data of multiple deep learning applications based on one or more deep neural network models.

At step 220, a training dataset for creating a training model is extracted based on the obtained performance benchmark database. The training dataset includes a plurality of parameter dimensions corresponding to dimensions of an estimation model to be created. These parameter dimensions include: structure of the deep neural network models of multiple deep learning applications, resource configuration of multiple deep learning applications, and training time of multiple deep learning applications (for example, mini-batch running time). In some embodiments, more parameter dimensions may be included. For example, other possible parameter dimensions of the training dataset may include one or more of the following: size of the input dataset; resource utilization rate; and hyper-parameters of deep learning applications. It shall be appreciated by those skilled in the art that the training dataset may further include any proper parameter dimensions that are not explicitly listed herein. The more diverse the parameter dimensions are, the higher the dimensions of the created estimation model will be, that is to say, the more complicated the estimation model is; accordingly, the higher the flexibility and accuracy of resource estimation will be. As a matter of fact, when there are various parameter dimensions of the training dataset, it means that more parameters should be considered during the estimation process. Therefore, a finer design is required for obtaining the benchmark database at step 210 so as to cover various elements to be considered during the training. This will be further understood in combination with the examples to be described below.

At step 230, correspondence among parameter dimensions of the training dataset is created so as to construct an estimation model for estimating resources used by deep learning applications. For example, the constructed estimation model may be a machine learning model. In some embodiments, it is also possible to create the correspondence among parameter dimensions of the training dataset based on some criteria, which provides factors, which is also referred to as "constraints," to be considered for creating the estimation model. For example, the correspondence among dimensions may be created, in the condition that the "constraint" of minimizing resource consumption should be met as much as possible. Alternatively or additionally, the correspondence among the dimensions may be created in the condition that linearity may be maintained between parameter dimensions of the structure of the deep neural network model of multiple deep learning applications and other parameter dimensions.

To obtain the performance benchmark database, one or more sample workload programs may be customized on demand. By running various customized sample workload programs under different running conditions, various data required in the performance benchmark database can be obtained. The customized sample workload programs may simulate various applications based on deep neural network models, for instance, depending on a certain deep neural network model and the set complexity, resource configuration, input data size, and so on.

In an embodiment, at least one sample workload program of the deep neural network model with customized complexity may be run under different running conditions. The running conditions may be defined with the following different value combinations: computing resource configuration and input data size. Thus, the training time of at least one sample workload program having a customized deep neural network model may be obtained under different running conditions. Similarly, the complexity of the deep neural network model may also be customized so that under the same running conditions (for instance, the same resource configuration and the same input data size), the training time of at least one sample workload program of deep neural network model having various complexity can be obtained. By means of running the customized sample workload program in the above manner, the obtained training time data may be used as time performance data in the performance benchmark database. Furthermore, the structural data of the customized deep neural network model of the sample workload program may be used as the structural data of the deep neural network model in the performance benchmark database.

In an embodiment, to optimize precision of the obtained training time data, the sample workload program of a deep customized neural network model is executed multiple times under the same running conditions and the training time of the sample workload program is averaged. Since it is also rather time-consuming to run the entire sample workload program of the deep customized neural network model, only the training time of the first N+1 steps of the sample workload program is obtained and the average training time from step 2 to step N+1 is calculated to estimate the training time (namely, a small step running time) of the sample workload program. It is to be appreciated the training time of the first step further includes additional time consumption for initializing the model, parameters, and so on. In order to obtain the training time more accurately, the average training time from step 2 to step N+1 may be calculated so as to eliminate estimation noise as much as possible.

Additionally or alternatively, in an embodiment, it is possible to obtain the structural data of the customized deep neural network models depending on the complexity of the specific deep neural network models. That is, the structural data of the deep neural network models may include structural parameters associated with the computing strength of a specific deep neural network model. For example, in an application based on a convolutional neural network model, the structural data may include: structural parameters associated with the computing strength of the convolutional layer of the convolutional neural network model, and structural parameters associated with the computing strength of the fully-connected layer of the convolutional neural network model. This is because for a convolutional neural network model, the computing amount and the completion time of its training are closely related to the structure of the convolutional layer and the fully-connected layer. The number of filters of a single convolutional layer and the output depth of the previous layer determine the number of parameters of the convolutional layer while each parameter needs to consume a large number of floating-point operations (FLOPs). In a fully-connected layer, the large number of trainable parameters may require occupancy of large storage space to store weights and gradients. Each trainable parameter corresponds to a FLOP. Further, in an embodiment, the structure of the convolutional neural network may be customized to meet some of the required criteria so as to simplify the customization process. For example, these criteria may include: minimizing resources consumed by a basic model as much as possible; and/or maintaining linear relation between the number of trainable parameters and each kind of customization (for example, changes of the number of convolutional filters at a particular convolutional layer). Those skilled in the art will realize that customization using any feasible or appropriate criteria may be performed.

Figure 3:
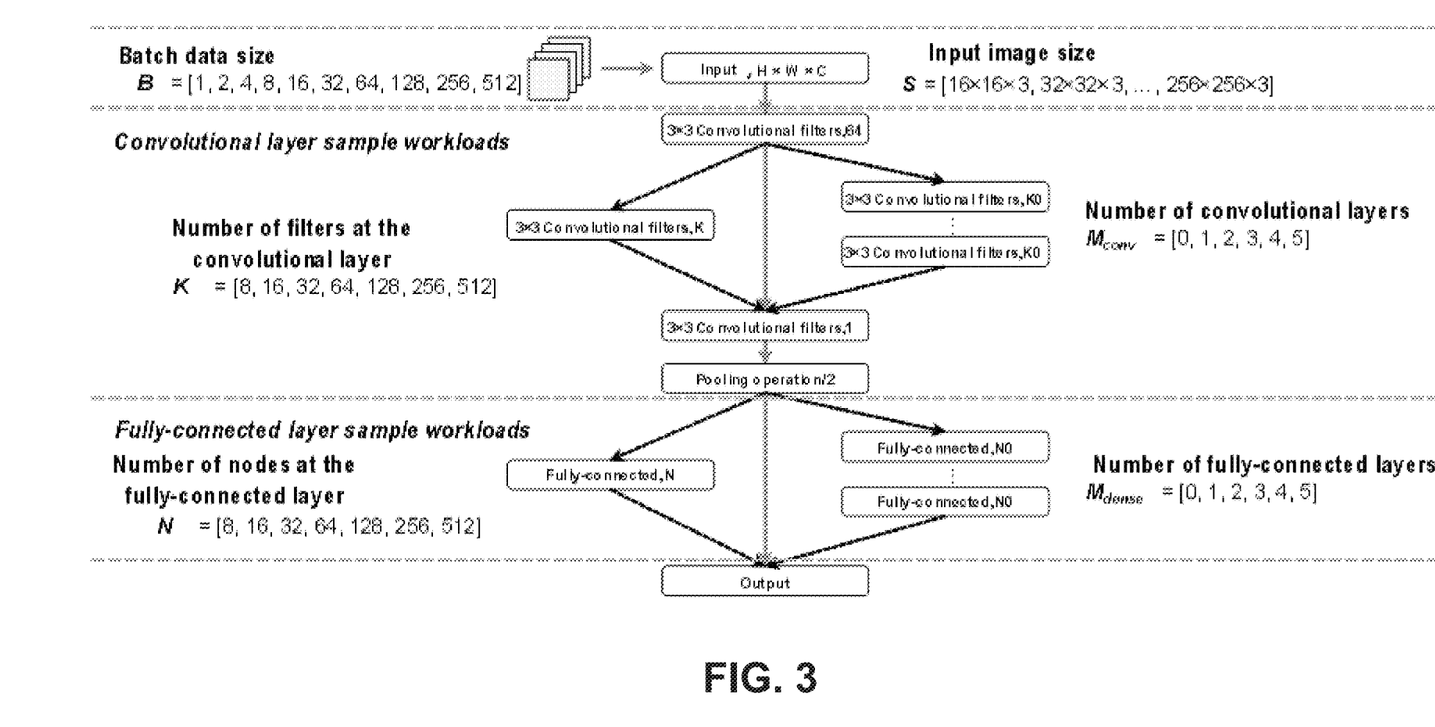
FIG. 3 is a schematic diagram illustrating customization of sample workload programs for creating an estimation model in accordance with an embodiment of the present disclosure.

FIG. 3 is a schematic diagram illustrating customization of a sample workload program for creating an estimation model in accordance with an embodiment of the present disclosure. In this example, a convolutional neural network is used. However, those skilled in the art will appreciate that similar approaches to customizing the sample workload program may also be applied to other types of deep neural network models.

As shown in FIG. 3, in the exemplary customization of the sample workload programs of convolutional neural networks, three sample workloads based on convolutional neural networks run on three types of GPU resources, and there are the following four types of structural customization of the convolutional neural networks:

the number of filters at a specific convolutional layer K=[8, 16, 32, 64, 128, 256, 512];

the number of convolutional layers $M_{conv}$=[0, 1, 2, 3, 4, 5];

the number of nodes at a specific fully-connected layer N=[8, 16, 32, 64, 128, 256, 512];

the number of fully-connected layers $M_{dense}$=[0, 1, 2, 3, 4, 5].

Each sample workload program based on the convolutional neural networks runs on three types of GPU resources, and batch data size and different input image sizes are utilized:

batch data size B=[1, 2, 4, 8, 16, 32, 64, 128, 256, 512];

input image size S=[16×16×3, 32×32×3, 48×48×3, . . . , 224×224×3, 256×256×3].

In the example for customizing the sample workload programs depicted with reference to FIG. 3, the running conditions of the sample workload programs are defined by input dataset and computing resource configuration.

As an example, the input dataset may be configured based on the following Table 1.

TABLE 1

Example input dataset

| Image dataset | Shape (height H × width W × channel C) | Size (pixel) |
| --- | --- | --- |
| MNIST | 28 × 28 × 1 | 784 |
| CIFAR10 | 32 × 32 × 3 | 3,072 |
| DogsCats | 128 × 128 × 3 | 49,152 |

As an example, the computing resource configuration may be performed based on the following Table 2.

TABLE 2

Example computing resource configuration

| GPU model | Power (W) | CUDA core | TFLOPS (FP32) | Memory (MB) | Storage bandwidth (GB/s) | GPU number |
| --- | --- | --- | --- | --- | --- | --- |
| Tesla P4 | 75 | 2,560 | 5.5 | 7,606 | 192 | ×2 |
| Tesla M40 | 250 | 3,072 | 7 | 11,443 | 288 | ×2 |
| Tesla P100 | 300 | 3,840 | 10 | 16,276 | 732 | ×4 |

Under various running conditions shown by Table 1 and Table 2, the corresponding training time may be obtained by running the various sample workload programs depicted with reference to FIG. 3 as an output. In an embodiment, step (a small step, mini-batch) training time may be collected. For example, the batch data size B increases from 1 to 512. For each batch data value, the step training time of the first N+1 steps is collected, where N may be a positive integer, for instance, 20. As the first step does not only include training time, but also time consumed by initialization like model compiling, model loading and data loading, to estimate the step training time more accurately, the time of the first step may be excluded when the average time is calculated. In this example, through multiple times of operations, the average time from step 2 to step N+1, for example, an estimation of the training time may be calculated as the average time from step 2 to step 20.

Those skilled in the art will appreciate that various data required by the performance benchmark database, such as data structure data, time performance data and computing resource consumption data of the deep neural network model, may be obtained by running the customized sample workload programs as described above. Various parameter dimensions may be extracted based on the performance benchmark database to create an estimation model.

Figure 4:
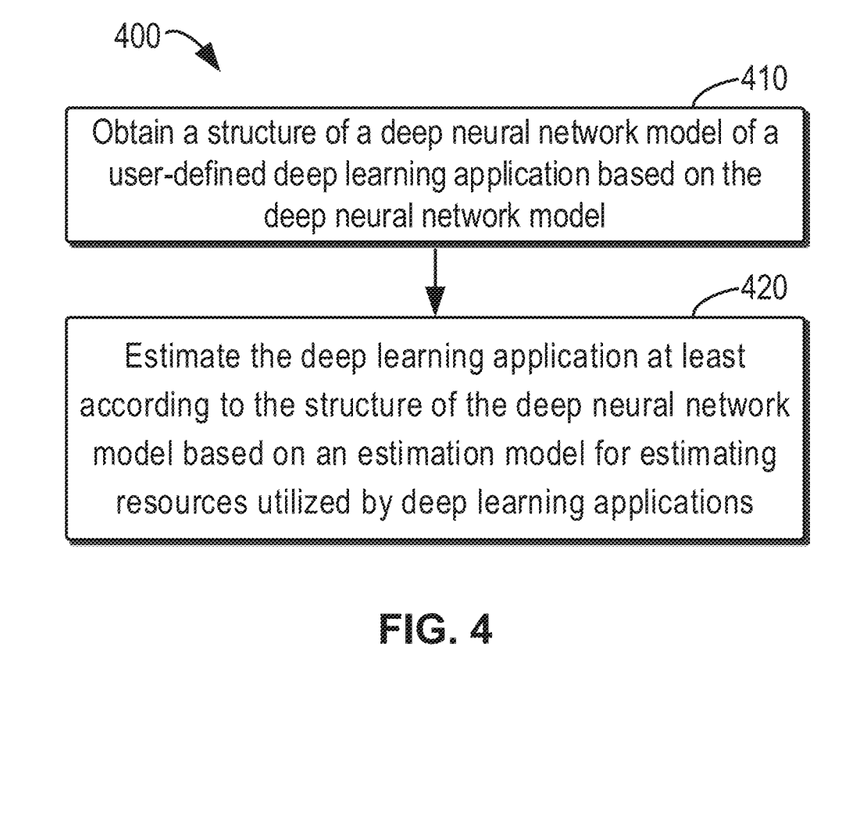
FIG. 4 is a flowchart illustrating a process for estimating a deep learning application in accordance with an embodiment of the present disclosure.

FIG. 4 is a flowchart illustrating a process 400 for estimating a deep learning application in accordance with an embodiment of the present disclosure.

As shown in FIG. 4, at step 410, the structure of the user-defined deep neural network model of the deep learning application based on the deep neural network model is obtained.

At step 420, the deep learning application is estimated based on the estimation model for estimating resources utilized by deep learning applications at least according to the structure of the deep neural network model. The estimation model may be created based on the embodiment depicted, for instance, with reference to FIG. 2 and it indicates the correspondence among multiple parameter dimensions. These parameter dimensions include: structures of deep neural network models of deep learning applications, resource configuration of deep learning applications, and the training time of deep learning applications. On the basis of the created estimation model, the parameter dimensions may further include input dataset size, resource utilization rate, hyper-parameters of the deep learning application, and so on.

In an embodiment, the estimation may be performed with a two-phase approach. The user may input requirements for one or more parameter dimensions at the same time, such as a customized set dataset and determined computing resources. The corresponding parameter dimension variable cluster in the estimation model is determined based on user's requirements. Specifically, the parameter dimension variable cluster is specified by constraints of one or more parameter dimensions defined by the parameter requirements input by the user. With a linear regression algorithm, the user-defined deep learning application may be estimated based on the estimation model within a range of the parameter variable cluster.

Figure 5:
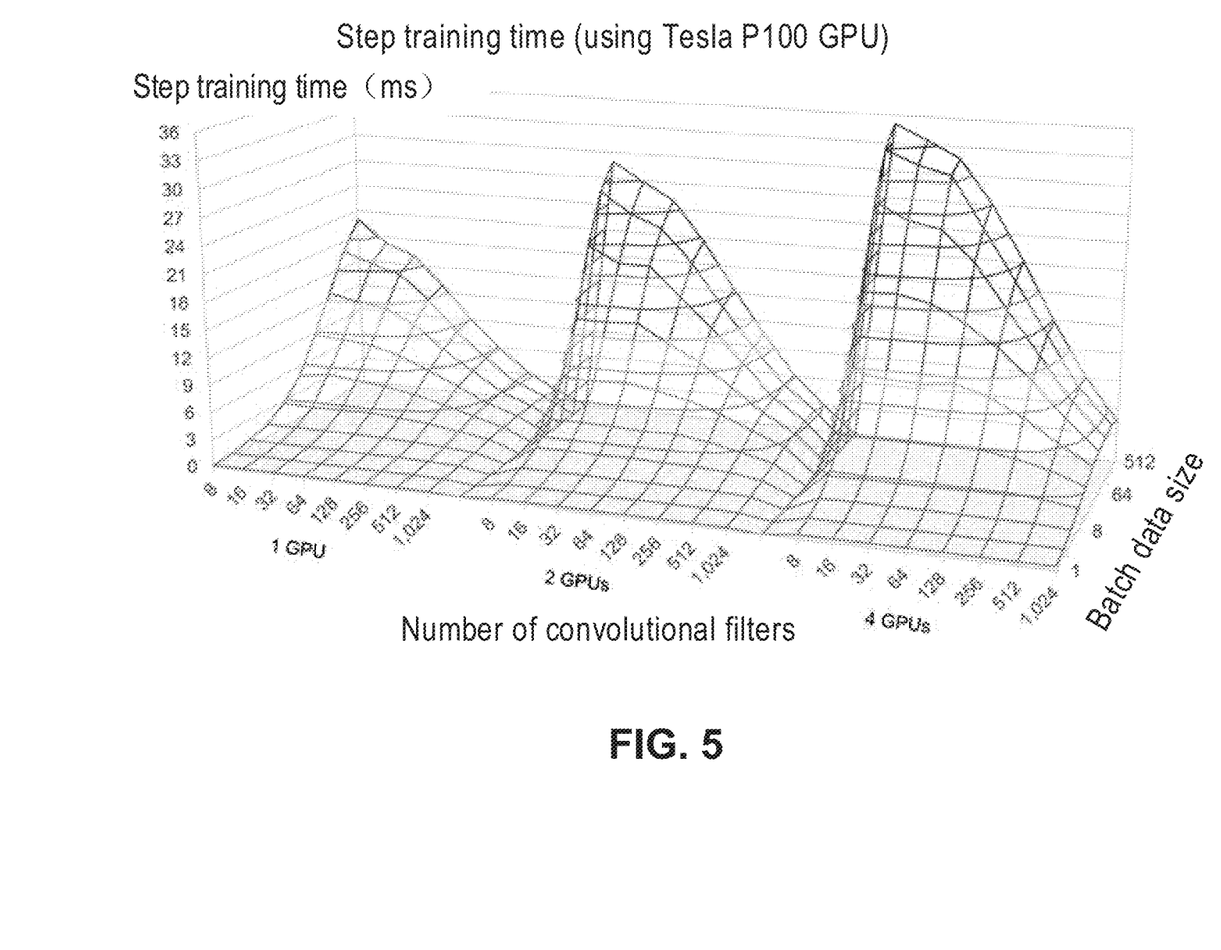
FIG. 5 is a schematic diagram illustrating a parameter dimension variable cluster in a parameter dimension space of an estimation model in accordance with an embodiment of the present disclosure.

FIG. 5 is a schematic diagram illustrating a parameter dimension variable cluster in a parameter dimension space of an estimation model in accordance with an embodiment of the present disclosure.

The exemplary parameter space shown in FIG. 5 is a space formed by three parameter dimensions, "step training time," "number of convolutional filters," and "input data size." For ease of depiction, in the example shown in FIG. 5, the computing and resource configuration is set to use one type of GPU, namely, Tesla P100 type GPU, and the number of GPUs as illustrated may be configured as 1, 2 and 3. Through a learning process, the estimation model may present, for instance, a multi-dimensional shape in the step training time space as shown in FIG. 5. Depending on the structure data of the deep neural network model derived from the user-defined deep learning application and user's specific requirement for the performance or resource, different combinations of various different parameter dimension variables (namely, parameter dimension variable cluster) may be determined, and accordingly, specific parts in the estimation model are determined. For example, the variable combinations that may form a cluster of the parameter dimension variables may be GPU model, GPU number, structure parameters associated with computing strength of the deep neural network model and so on.

Based on the user-defined deep learning application and user's requirements for training time, resource configuration and so on, the parameter dimension variable cluster may be determined. Thus, with a linear regression algorithm, the user-defined deep learning application is estimated within the range determined by the parameter variable cluster in the estimation model.

Figure 6:
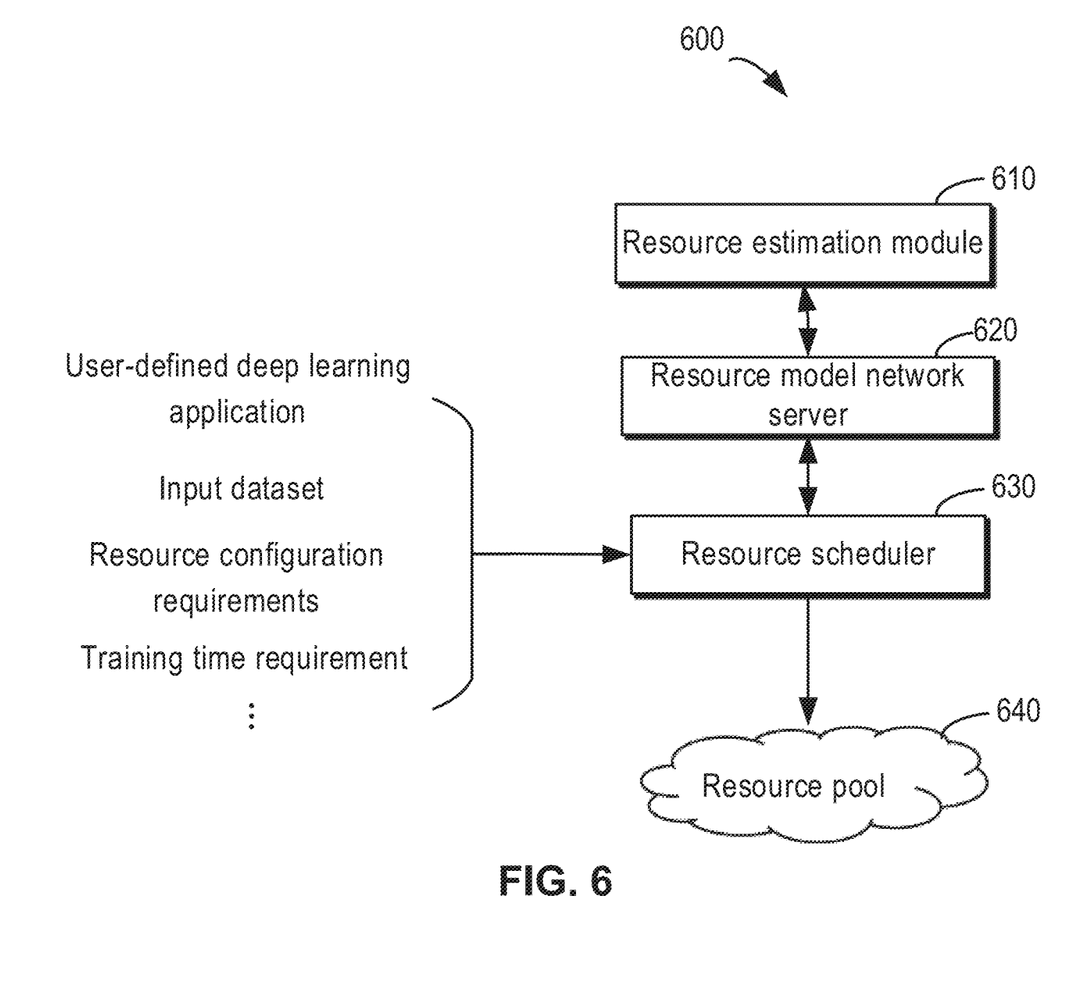
FIG. 6 is a schematic diagram illustrating a network environment in which an embodiment of the present disclosure can be implemented.

FIG. 6 is a schematic diagram of a network environment in which an embodiment of the present disclosure can be implemented.

According to the embodiment shown in FIG. 6, the user-defined deep learning application may be estimated via a network service. As shown in FIG. 6, the network service system 600 may include a resource estimation module 610, a resource model network server 620, a resource scheduler 630 and a resource pool 640 used for running the user-defined deep learning application.

The resource scheduler 630 may receive user's input, which at least needs to include information about user-defined deep learning application, such as application code and the structure of the deep neural network model that the deep learning application is based on. In some implementations, the user's input may include more aspects. For example, it may require the user to define the needed input dataset, such as the type and size of the input dataset. Additionally or alternatively, the user may further specify the requirement for the resource configuration needed for running the user-defined deep learning application, for instance, using at most 2 GPUs or occupying the smallest number of GPUs, and so on. Additionally or alternatively, the user may further specify requirement for the training time of the deep learning application based on his needs, for instance, specify the maximum value of time for completing a round of training. Those skilled in the art will appreciate that various user input options may be designed based on the parameter dimensions of the constructed estimation model. The limitation on the parameter dimensions provided by the user may be utilized by the resource estimation module to create the parameter dimension variable cluster in the manner depicted with reference to FIG. 5, for instance, and thus, facilitates estimation of the resources required by the deep learning application.

The resource scheduler 630 may transmit, to the resource model network server 620, a resource estimation request which carries information about the user-defined deep learning application input by the user and other additional information input by the user. The resource estimation request may further carry information about available resources of the current resource pool 640.

After receiving the estimation request, the resource model network server 620 feeds relevant data contained in the request to the resource estimation module 610.

The resource estimation module 610 has a resource estimation model for estimating deep learning applications. The estimation model may be constructed beforehand, for instance, with the methods depicted with reference to FIG. 2 and FIG. 3. The resource estimation module 610 estimates the resources required by the user-defined deep learning application based on the estimation model with the methods described with reference to FIG. 4 and FIG. 5, for instance. The resource estimation module 610 returns to the resource model network server 620 the estimation result including, for instance, training time of the user-defined deep learning application, the required computing resource configuration and so on.

The resource model network server 620 issues a resource estimation response to the resource scheduler 630 to notify the estimation result for the user's input.

In an embodiment, the resource scheduler 630 may allocate required computing resources to the user-defined deep learning application based on the estimation result. Alternatively, the resource scheduler 630 may deploy the user-defined deep learning application to the allocated hardware resources.

Although the resource estimation module 610, resource model network server 620, and resource scheduler 630 in FIG. 6 are shown as blocks separated from each other, it should be appreciated by those skilled in the art that some or all the functions of these models may be combined or further divided. Particularly, in the network service architecture running in a cloud platform, the steps and functions described with reference to FIG. 6 are possibly distributed in one or more entities in the network. However, various implementation variants do not go beyond the scope of the present disclosure.

According to the disclosed scheme, an estimation model for deep learning applications can be trained and constructed so that the resources used by a user-defined deep learning application can be estimated effectively without the need to actually run deep learning applications on the hardware. Based on the estimation result, an optimized resource utilization scheme may be provided to the user more easily and guidance is provided when a deep learning application needs to be deployed.

The functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method, comprising:
obtaining a performance benchmark database, wherein the performance benchmark database includes at least structural data of one or more deep neural network models, time performance data comprising at least an average training time of a plurality of deep learning applications based on the one or more deep neural network models, computing resource consumption data comprising at least one of power consumption data, memory consumption data, and storage consumption data of the plurality of deep learning applications based on the one or more deep neural network models, and computing resource configuration data of the plurality of deep learning applications comprising at least a processing unit associated with the one or more deep neural network models of the plurality of deep learning applications;
extracting a training dataset based on the performance benchmark database, wherein the training dataset has a plurality of parameter dimensions, the plurality of parameter dimensions include at least portions of the structural data, the time performance data, the computing resource consumption data, and the computing resource configuration data of the one or more deep neural network models of the plurality of deep learning applications;
creating an estimation model for estimating resources utilized by the plurality of deep learning applications, wherein creating the estimation model comprises creating correspondence between ones of the plurality of parameter dimensions of the extracted training dataset to meet a given criteria, and wherein the given criteria comprises maintaining a linear relation between the plurality of parameter dimensions of the structural data of the one or more deep neural network models of the plurality of deep learning applications and a plurality of other parameter dimensions, and wherein the estimation model is a machine learning model;
allocating system available resources based on the estimation model; and
causing the allocated system available resources to execute one or more given deep learning applications;
wherein the one or more deep neural network models of the plurality of deep learning applications comprise one or more convolutional neural network models
wherein the structural data of the one or more deep neural network models of the plurality of deep learning applications comprises:
structural parameters associated with a computing strength of a convolutional layer of a convolutional neural network model of the one or more convolutional neural network models, wherein the computing strength of the convolutional layer is based on a number of filters of the convolutional layer; and
structural parameters associated with a computing strength of a fully-connected layer of a convolutional neural network model of the one or more convolutional neural network models, wherein the computing strength of the fully-connected layer is based on a number of nodes of the fully-connected layer;
wherein the number of filters of a given convolutional layer and an output of a previous convolutional layer determine the number of parameters of the given convolutional layer to meet the given criteria; and
wherein the maintaining a linear relation between the plurality of parameter dimensions of structures of deep neural network models of the plurality of deep learning applications and the plurality of other parameter dimensions comprises maintaining a linear relation between a number of trainable parameters and changes of the number of filters at the given convolutional layer to meet the given criteria.

2. The method according to claim 1, wherein the obtaining the performance benchmark database comprises:
running, under different running conditions, at least one sample workload program having a customized deep neural network model, wherein the different running conditions are defined by at least different value combinations of: a computing resource configuration and input data size; and
obtaining training time of the at least one sample workload program having the customized deep neural network model under the different running conditions,
wherein the structural data of the one or more deep neural network models in the performance benchmark database includes structural data of the customized deep neural network model, and the time performance data in the performance benchmark database includes the obtained training time.

3. The method according to claim 2, wherein the obtaining the training time of the at least one sample workload program having a customized deep neural network model under the different running conditions comprises:
running the at least one sample workload program having a customized deep neural network model at least once under a same running condition;
obtaining a training time of a first N+1 steps of a sample workload program; and
calculating an average training time from step 2 to step N+1.

4. The method according to claim 1, wherein the plurality of parameter dimensions of the training dataset further comprises one or more of:
an input dataset size;
a resource utilization rate; and
hyper-parameters for deep learning applications.

5. The method according to claim 1, wherein creating the estimation model for estimating resources utilized by deep learning applications is based on minimizing resource consumption.

6. A computer program product being tangibly stored on a non-transitory computer readable medium and comprising machine executable instructions, which, when executed, cause the machine to perform a method according to claim 1.

7. A device, comprising:
a processing unit; and
a memory coupled to the processing unit and containing instructions stored thereon, which, when executed by the processing unit, cause the device to perform acts of:
obtaining a performance benchmark database, wherein the performance benchmark database includes at least structural data of one or more deep neural network models, time performance data comprising at least an average training time of a plurality of deep learning applications based on the one or more deep neural network models, computing resource consumption data comprising at least one of power consumption data, memory consumption data, and storage consumption data of the plurality of deep learning applications based on the one or more deep neural network models, and computing resource configuration data of the plurality of deep learning applications comprising at least a processing unit associated with the one or more deep neural network models of the plurality of deep learning applications;

extracting a training dataset based on the performance benchmark database, wherein the training dataset has a plurality of parameter dimensions, the plurality of parameter dimensions include at least portions of the structural data, the time performance data, the computing resource consumption data, and the computing resource configuration data of the one or more deep neural network models of the plurality of deep learning applications;

creating an estimation model for estimating resources utilized by the plurality of deep learning applications, wherein creating the estimation model comprises creating correspondence between ones of the plurality of parameter dimensions of the extracted training dataset to meet a given criteria, and wherein the given criteria comprises maintaining a linear relation between the plurality of parameter dimensions of the structural data of the one or more deep neural network models of the plurality of deep learning applications and a plurality of other parameter dimensions, and wherein the estimation model is a machine learning model;

allocating system available resources based on the estimation model; and causing the allocated system available resources to execute one or more given deep learning applications;

wherein the one or more deep neural network models of the plurality of deep learning applications comprise one or more convolutional neural network models wherein the structural data of the one or more deep neural network models of the plurality of deep learning applications comprise:

structural parameters associated with a computing strength of a convolutional layer of a convolutional neural network model of the one or more convolutional neural network models, wherein the computing strength of the convolutional layer is based on a number of filters of the convolutional layer; and structural parameters associated with a computing strength of a fully-connected layer of a convolutional neural network model of the one or more convolutional neural network models, wherein the computing strength of the fully-connected layer is based on a number of nodes of the fully-connected layer;

wherein the number of filters of a given convolutional layer and an output of a previous convolutional layer determine the number of parameters of the given convolutional layer to meet the given criteria; and wherein the maintaining a linear relation between parameter dimensions of structures of deep neural network models of the plurality of deep learning applications and the plurality of other parameter dimensions comprises maintaining a linear relation between a number of trainable parameters and changes of the number of filters at the given convolutional layer to meet the given criteria.

8. The device according to claim 7, wherein the obtaining the performance benchmark database comprises:

running, under different running conditions, at least one sample workload program having a customized deep neural network model, wherein the different running conditions are defined by at least different value combinations of: a computing resource configuration and input data size; and obtaining training time of the at least one sample workload program having the customized deep neural network model under the different running conditions, wherein the structural data of the one or more deep neural network models in the performance benchmark database includes structural data of the customized deep neural network model, and the time performance data in the performance benchmark database includes the obtained training time.

9. The device according to claim 8, wherein the obtaining the training time of the at least one sample workload program having a customized deep neural network model under the different running conditions comprises:

running the at least one sample workload program having a customized deep neural network model at least once under a same running condition;

obtaining a training time of a first N+1 steps of a sample workload program; and calculating an average training time from step 2 to step N+1.

10. The device according to claim 7, wherein the plurality of parameter dimensions of the training dataset further comprises one or more of:

an input dataset size;

a resource utilization rate; and hyper-parameters for deep learning applications.

11. The device according to claim 7, wherein creating the estimation model for estimating resources utilized by deep learning applications is based on minimizing a resource consumption.

12. A computer-implemented method, comprising:

obtaining a structure of a deep neural network model of a user-defined deep learning application based on the deep neural network model;

creating an estimation model;

estimating the user-defined deep learning application at least according to the structure of the deep neural network model based on the estimation model for estimating resources utilized by one or more deep learning applications, wherein the estimation model indicates constraints among a plurality of parameter dimensions defined by given parameter requirements, the plurality of parameter dimensions including: structural data of one or more deep neural network models of the one or more deep learning applications, computing resource configuration data of the deep learning applications comprising at least a processing unit associated with the one or more deep neural network models of the one or more deep learning applications, computing resource consumption data comprising at least one of power consumption data, memory consumption data, and storage consumption data of the one or more deep learning applications, and time performance data comprising at least an average training time of the one or more deep learning applications, wherein creating the estimation model comprises creating correspondence between ones of the plurality of parameter dimensions to meet a given criteria, and wherein the given criteria comprises maintaining a linear relation between the plurality of parameter dimensions of the structural data of the one or more deep neural network models of the one or more deep learning applications and a plurality of other parameter dimensions, and wherein the estimation model is a machine learning model;

allocating system available resources based on the estimation model; and causing the allocated system available resources to execute one or more given deep learning applications;

wherein estimating the user-defined deep learning application comprises:

determining a parameter dimension variable cluster in a parameter dimension space of the estimation model based on parameter requirements input by a user for different combinations of a plurality of parameter dimension variables, the parameter dimension variable cluster being specified by a range of the plurality of parameter dimension variables limited by the parameter requirements input by the user, the plurality of parameter dimensions being based on step training time, number of convolutional filters and input data size; and estimating, based on the estimation model, the user-defined deep learning application by using a linear regression algorithm within the range of the parameter dimension variable cluster;

wherein the one or more deep neural network models of the one or more deep learning applications comprise one or more convolutional neural network models, and wherein the structural data of the one or more deep neural network models of the one or more deep learning applications comprise:

structural parameters associated with a computing strength of a convolutional layer of a convolutional neural network model of the one or more convolutional neural network models, wherein the computing strength of the convolutional layer is based on a number of filters of the convolutional layer; and structural parameters associated with a computing strength of a fully-connected layer of a convolutional neural network model of the one or more convolutional neural network models, wherein the computing strength of the fully-connected layer is based on a number of nodes of the fully-connected layer; and wherein the maintaining a linear relation between the plurality of parameter dimensions of structures of the one or more deep neural network models of the one or more deep learning applications and the plurality of other parameter dimensions comprises maintaining a linear relation between a number of trainable parameters and changes of the number of convolutional filters at a given convolutional layer to meet the given criteria.

13. The method according to claim 12, wherein the plurality of parameter dimensions further comprises one or more of:

an input dataset size;

a resource utilization rate; and hyper-parameters of deep learning applications.

14. A computer program product being tangibly stored on a non-transitory computer readable medium and comprising machine executable instructions, which, when executed, cause the machine to perform a method according to claim 12.

15. A device, comprising a processing unit and a memory coupled to the processing unit and containing instructions stored thereon, which, when executed by the processing unit, cause the device to a method according to claim 12.

16. The computer program product according to claim 8, wherein the obtaining the performance benchmark database comprises:

running, under different running conditions, at least one sample workload program having a customized deep neural network model, wherein the different running conditions are defined by at least different value combinations of: a computing resource configuration and input data size; and obtaining training time of the at least one sample workload program having the customized deep neural network model under the different running conditions;

wherein the structural data of the one or more deep neural network models in the performance benchmark database includes structural data of the customized deep neural network model, and the time performance data in the performance benchmark database includes the obtained training time; and wherein the obtaining the training time of the at least one sample workload program having a customized deep neural network model under the different running conditions comprises:

running the at least one sample workload program having a customized deep neural network model at least once under a same running condition;

obtaining a training time of a first N+1 steps of a sample workload program; and calculating an average training time from step 2 to step N+1.

17. The computer program product according to claim 6, wherein the plurality of parameter dimensions of the training dataset further comprises one or more of:

an input dataset size;

a resource utilization rate; and hyper-parameters for deep learning applications.

18. The computer program product according to claim 6, wherein creating the estimation model for estimating resources utilized by deep learning applications is based on minimizing resource consumption.

19. The method of claim 1, wherein in the fully-connected layer, the number of trainable parameters requires occupancy of storage space to store weights and gradients where each trainable parameter corresponds to a floating-point operation.

20. The device according to claim 7, wherein in the fully-connected layer, the number of trainable parameters requires occupancy of storage space to store weights and gradients where each trainable parameter corresponds to a floating-point operation.

* * * * *